United States Patent
Boller

[11] 4,228,794
[45] Oct. 21, 1980

[54] MASSAGER WITH DUMBBELL-SHAPED HOUSING

[76] Inventor: Hans Boller, Steineggerstrasse, CH 8503 Hüttwilen, Switzerland

[21] Appl. No.: 946,601

[22] Filed: Sep. 28, 1978

[30] Foreign Application Priority Data

Oct. 3, 1977 [CH] Switzerland .................. 12085/77

[51] Int. Cl.² ............................................. A61H 7/00
[52] U.S. Cl. ..................................................... 128/49
[58] Field of Search ...................................... 128/44–55

[56] References Cited

U.S. PATENT DOCUMENTS

| | | | |
|---|---|---|---|
| 1,098,337 | 5/1914 | Soukup | 128/55 |
| 1,951,776 | 3/1934 | Shelton | 128/46 |
| 3,424,149 | 1/1969 | Fujimoto | 128/55 |
| 3,499,439 | 3/1970 | Boller | 128/49 |
| 3,536,064 | 10/1970 | Kuroda et al. | 128/49 |

Primary Examiner—Lawrence W. Trapp
Attorney, Agent, or Firm—Karl F. Ross

[57] ABSTRACT

A massager comprises a dumbbell-shaped housing having a relatively large upper part, a narrow intermediate part, and a relatively large lower part. An electric motor is housed in the upper part and has an at least partially flexible shaft extending through the intermediate part and connected via a transmission in the lower part to massage fingers extending axially from this lower part. A fan mounted on this shaft in the intermediate portion sucks air in through slots through which the massage fingers extend, moves it axially through the housing, and expels it from holes in the upper end of the housing.

9 Claims, 7 Drawing Figures

MASSAGER WITH DUMBBELL-SHAPED HOUSING

FIELD OF INVENTION

The present invention relates to a massager. More particular this invention concerns an electrically powered massager having vibratory massage fingers.

BACKGROUND OF THE INVENTION

Massagers are known, as for example from my earlier U.S. Pat. No. 3,499,439 as well as U.S. Pat. Nos. 1,931,849 and 2,867,211, cited therein, which have a housing adapted to be held in the hand and containing a motor and a transmission connected to vibratory massaging fingers extending from the housing. The transmission is normally relatively bulky, constituting a pinion that drives a plurality of planetary-type gears in turn meshing with a ring gear in turn carrying an eccentric pin that operates a crank. This crank in turn is connected to one of a plurality of intermeshing gears that themselves carry the inner ends of the vibratory fingers that extend through the lower side of the housing. Thus on rotation of the input pinion by the motor in the upper part of the housing the crank oscillates back and forth so as similarly to oscillate the massage fingers. These massage fingers are placed against the body portion of the person being massaged.

Such devices are typically rather hard to hold. As a rule they are made as small as possible at the upper motor part for grasping by the hand and they may even be provided with a laterally extending handle for best manipulation. Nonetheless the heavy lower part still is offcenter so that manipulation of the device is difficult.

A further difficulty of the known systems is that in an attempt to make them as compact as possible for easiest holding it is normally considered impossible to provide any type of cooling or ventilating system. Thus after some use the devices become rather hot and uncomfortable to hold.

The natural solution to both of these problems is to provide as small a motor as possible. This can be done by simply reducing the size and the power of the motor, thereby also reducing the effectiveness of the massage unit. It is also possible to provide a much higher quality and more compact motor, which nonetheless has the disadvantage of considerably raising the cost of the massager.

OBJECTS OF THE INVENTION

It is therefore an object of the instant invention to provide an improved massager.

Another object is to provide such a massager which is very easy to hold, yet which can be provided with a heavy-duty drive motor and with a ventilating system.

SUMMARY OF THE INVENTION

These objects are attained according to the instant invention by providing the massager with a dumbbell-shaped housing having an upper end, a lower end, and an intermediate portion between these ends and of smaller diameter than they have. The drive motor is provided in the upper end and has a shaft extending through the intermediate portion to the lower end which houses the transmission and from which the massage fingers extend. A ventilator is provided on the shaft between the two ends for circulating air axially through the housing.

The machine according to the instant invention therefore is extremely easy to hold, grasping it by its relatively small-diameter central portion. As the motor lies to one side of the portion that is held and the transmission to the other, the center of gravity of the device will be at the central handle portion so the device will be extremely easy to hold in any position. Thus the term "upper" and "lower" are herein used merely for the sake of convenience, it being understood that the device can operate in any orientation.

According to further features of this invention the fan is mounted in the intermediate portion on the shaft so that the waist or intermediate portion of the housing constitutes a Venturi-type passage. Holes are provided in the lower side of the housing for sucking air in and at the upper side of the housing for expelling the air. More particularly these holes at the lower side may also be the holes through which the fingers project with play. These air intake holes in fact are arcuate slots in which the fingers oscillate. The transmission according to this invention includes one relatively large-diameter gear that is formed with several axially throughgoing passages for flow of air through this gear and around the other gears of the transmission for best cooling effect. Thus with the system of the invention air will be drawn axially in one end of the housing and expelled from the other, cooling the gears and the motor thereof so that the device will remain relatively cool. As no heat-generating mechanism is provided in the narrow waist region where the operator holds the device, even after long use the device will not become hot. In fact the Venturi effect will even dissipate the heat imparted to the three-part housing by the operator's hand.

SPECIFIC DESCRIPTION

Figure 1:
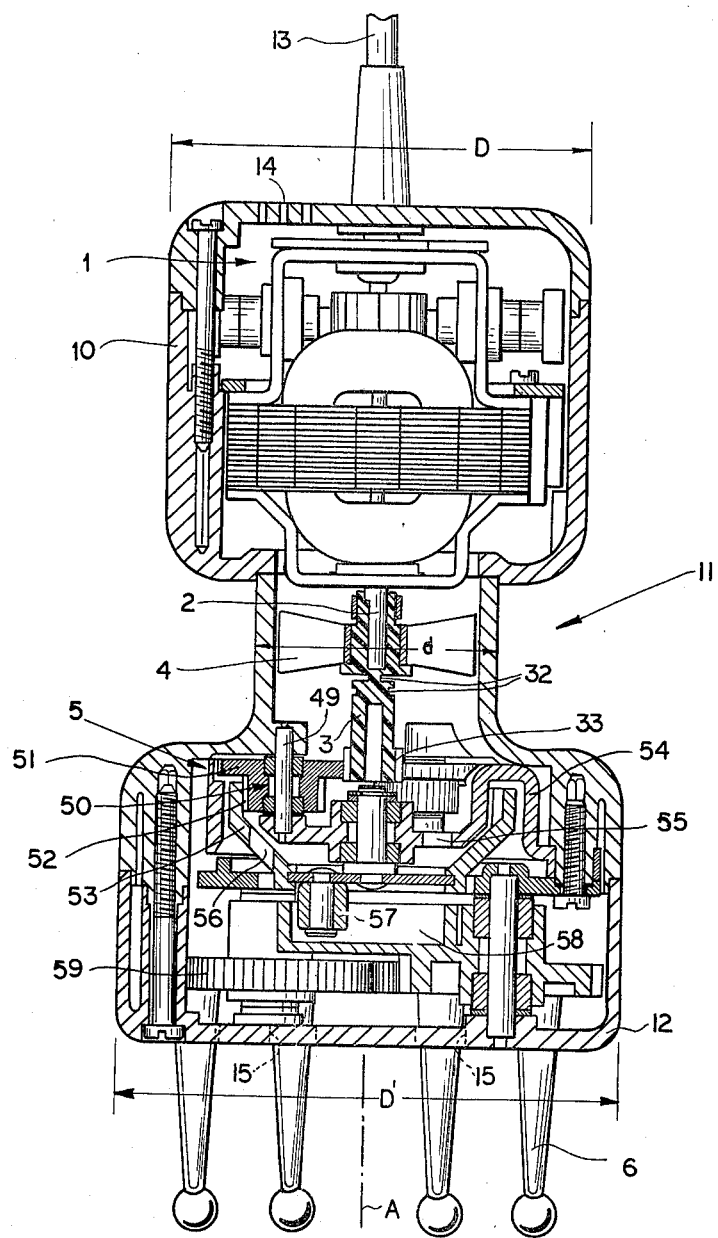
FIG. 1 is an axial section through a massager according to the instant invention.

As shown in the drawing a massager according to the instant invention has a three-part housing centered on an axis A and having a cylindrical upper part 10 having a diameter D, a lower cylindrical part 12 having a diameter D' greater by approximately one-fifth than the diameter D, and a cylindrical intermediate portion 11 having a diameter d equal to approximately three-fifths of the diameter. This housing is made of cast aluminum.

The upper part 10 houses an electric motor 1 fed with electricity via a cord 13 and having a rigid output shaft 2 centered on and rotated about the axis A. A flexible shaft 3 is fitted to this shaft 2 in the intermediate portion 11 and carries an axial-throughput fan 4 pitched to displace air axially through the housing from the lower part 12 toward the upper part 10. This flexible shaft 3 is made of synthetic-resin material and is formed with two axially spaced pairs of parallel grooves 32 forming thin webs extending at right angles to each other so that the upper part of the shaft 3 can flex relative to the lower part thereof.

This lower part 3 is connected via a transmission 5 to a plurality, here eight, of massage fingers 6 substantially as described in my copending and jointly filed patent application No. 946,640.

The transmission 5 basically comprises a central pinion 33 formed at the lower end of the flexible shaft 3 and meshing with three planatary-type gears 50 angularly equispaced about the axis A and mounted on respective shafts 49 fixed in the housing 10–12. Each of these gears 50 has a large-diameter upper portion 51 formed with teeth meshing with the gear 33 and a small-diameter lower portion 52 meshing with internal teeth formed on a large-diameter ring gear 53 journaled in a fixed holder 54 bolted in the housing and formed with three radially throughgoing cutouts through which the gears 50 pass. On its lower side the gear 53 carries an offcenter crank pin 57 engaged in a crank arm 58 on one of four identical meshing gears 59 each of which carries two of the massage fingers 6.

Thus as the motor 1 rotates the shaft 2 it will in turn rotate the gear 33 to drive the gears 50 about their respective axes at a slower speed than that of shaft 2. This speed will be stepped down once again by meshing of the gear formations 51 with the large gear 53 that will then orbit the crankpin 57 about to oscillate the crank 58 back and forth. This oscillatory motion in turn will be transmitted to the one gear 59 and thence to the other gears 59 meshing therewith. The result will be an arcuate motion of the fingers 6 about the axis of the respective gears 57.

The lower part 12 of the housing 12 has at its lower wall a plurality of slots 15 each receiving a respective finger 6 with play. Similarly the gear 53 is formed with axially throughgoing holes 56 and the support plate 54 is formed with axially throughgoing holes 55. The top wall of the housing is formed with small throughgoing holes 14. The fan 4 is pitched to displace air from the lower part 12 to the upper part 10. This air will be aspirated through the holes 15, pass through the holes 56 and 55, then pass up through the intermediate portion 11, around the motor 1, and out through the holes 11. The result will be an excellent and effective cooling of the entire mechanism inside the housing 10–12. Air flow will be at maximum speed at the Venturi-like waist portion 11 so that this portion, which is the part to be held in hand by the user, will be the coolest part of the housing. As the transmission 5 generates little heat, the system according to the instant invention ensures even that heat imparted to the housing by the hand of the user grasping the portion 11 will be dissipated. For this reason the housing will always remain cool to the touch and pleasant to hold. What is more the motor 1 has a weight substantially equal to that of the transmission 5 so that the center of gravity of the housing lies in the intermediate portion on the axis A. This therefore makes the housing extremely easy to hold in any position.

Figure 2:
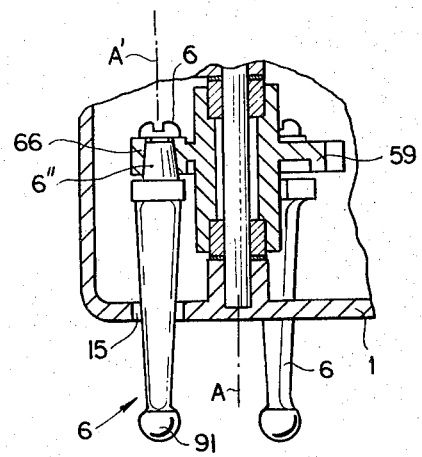
FIG. 2 is an axial section through a portion of the massager of the invention.
Figure 3:
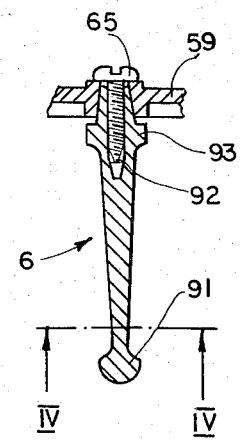
FIG. 3 is an axial section through one of the fingers shown in FIG. 2.

As described in my above-cited copending application and as shown in FIG. 2 each of the fingers 6 has an intermediate portion 6' tapered away from the respective gear 59 and has an outer part-spherical tip or end 91 and an inner frustoconical end 6". Each end 6" is received in a corresponding shaped frustoconical hole 66 formed in the gear 59. Furthermore as shown in FIG. 3 each of the fingers 6 has a polygonal, here hexagonal, blind bore 92 terminating at its inner end 6" and receiving a sheet metal or machine screw 65 whose head bears on the respective gear 59. The use of a polygonal-section hole 92 allows a standard screw, not of the self-tapping type, to be screwed into the hole 92 while maintaining a good contact with the walls thereof. During such mounting a wrench is fitted over a hexagonal or otherwise faceted rim 93 formed immediately below the frustoconical inner end 6" on the upper extreme end of the intermediate portion 6'.

Figure 4:
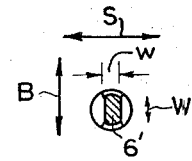
FIG. 4 is a section taken along line IV—IV of FIG. 3.

As shown in FIG. 4 each of the fingers 6 is oscillated in a direction S which is also the direction of elongation of the respective slot 15 and has a relatively narrow width w at its intermediate portion 6' measured in this direction S. On the other hand the intermediate portion 3' has a width W much greater than, here twice, its width w measured in a direction B transverse to the oscillation or elongated direction S. It is noted that in reality the fingers 6 are oscillated about the axis A so that the direction S shown to be straight in FIG. 3 is actually slightly curved or arcuate. These fingers 6 are of metal or a rigid synthetic resin.

Figure 7:
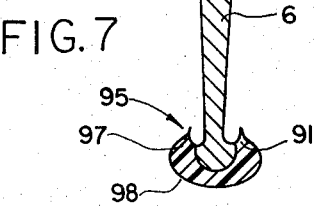
FIG. 7 is an axial section through a finger according to this invention with a tip accessory.

It is possible as shown in FIG. 7 to provide each of the lower ends 91, which are of a greater than semispherical outer shape, with a cap 95 formed with a recess 90 complementary shaped to the end 91 and formed with a rim 97 that extends inwardly and snaps over the tip 91 to hold the cap 96 in place. This cap 96 is made of a soft and elastomeric thermoplastic resin for use of the massager on tender or very bony areas.

Figure 5:
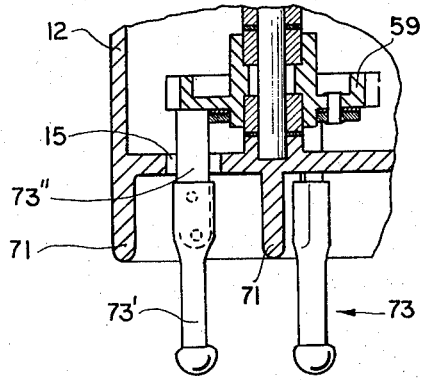
FIGS. 5 and 6 are perspective views corresponding to FIGS. 2 and 3 of another massager according to this invention.
Figure 6:
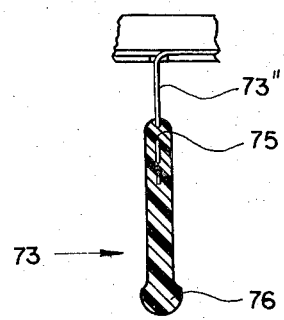

As shown in FIGS. 5 and 6 it is possible for the housing part 12 to be formed with a rim 71 that projects beyond its wall formed with arcuate slots 15 through which pass fingers 73 mounted on a gear 74. These fingers 73 only project at their outer ends beyond the rim 71 of the housing part 12. In addition each of the fingers 73 is here formed of a lower synthetic-resin portion 75 secured to a spring-steel upper portion 73". The lower portion 73' has a rounded head 76 and the spring steel portion 73' is imbedded in this lower portion. Holes 75 in the spring-steel portion 73' ensure a good and integral connection between the two parts 73' and 73". The upper ends of the spring-steel strips constituting the portions 73" are bent over and riveted to the gear 74. In this arrangement the planes of the spring-steel strips 73' are radial of the axis of rotation of the gear 74.

I claim:

1. A massager comprising:
    a housing elongated along a housing axis and having an upper end, a lower end, and an intermediate portion between and of smaller dimension than said ends transverse to said housing axis, said upper and lower ends being of outer diameters at least one-half greater than the outer diameter of said intermediate portion;
    a shaft in said housing extending generally axially between said ends thereof;
    a plurality of fingers projecting generally axially from said lower end and vibratory in a direction generally perpendicular to said housing axis;
    a transmission in said lower end between said shaft and said fingers;
    a fan on said shaft generally between said ends of said housing and having an outer diameter equal substantially to the inner diameter of said intermediate portion; and drive means including an electric motor in said upper end for rotating said shaft and thereby vibrating said fingers and operating said shaft to force air axially through said housing.

2. The massager defined in claim 1 wherein said upper end is formed with throughgoing holes constituting air-intake openings for said fan.

3. The massager defined in claim 2 wherein said fingers each project with play through a respective one of said throughgoing holes.

4. The massager defined in claim 2 wherein said housing has at said upper part an upper side formed with throughgoing holes constituting air-outlet openings.

5. The massager defined in claim 1 wherein said shaft has between said upper and lower ends a flexible portion.

6. The massager defined in claim 5 wherein said flexible portion is of flexible synthetic-resin material.

7. A massager comprising:
- a housing elongated along a housing axis and having an upper end, a lower end, and an intermediate portion between and of smaller dimension than said ends transverse to said housing axis;
- a shaft in said housing extending generally axially between said ends thereof and having between said ends a flexible portion formed with two axially spaced pairs of generally diametral grooves, each pair of grooves being generally perpendicular to the other pair and each pair defining a respective generally diametral and flexible axially extending web;
- a plurality of fingers projecting generally axially from said lower end and vibratory in a direction generally perpendicular to said housing axis;
- a transmission in said lower end between said shaft and said fingers;
- a fan on said shaft generally between said ends of said housing; and
- drive means including an electric motor in said upper end for rotating said shaft and thereby vibrating said fingers and operating said fan to force air axially through said housing.

8. The massager defined in claim 7 wherein said notches are between said fan and said transmission.

9. A massager comprising:
- a housing elongated along a housing axis and having an upper end, a lower end, and an intermediate portion between and of smaller dimension than said ends transverse to said housing axis;
- a shaft in said housing extending generally axially between said ends thereof;
- a plurality of fingers projecting generally axially from said lower end and vibratory in a direction generally perpendicular to said housing axis;
- a transmission in said lower end between said shaft and said fingers and including a large-diameter gear rotatable generally about said axis and formed with a plurality of throughgoing holes constituting air passages;
- a fan on said shaft generally between said ends of said housing; and
- drive means including an electric motor in said upper end for rotating said shaft and thereby vibrating said fingers and operating said fan to force air axially through said housing.

* * * * *